US012388665B2

(12) United States Patent
Gao

(10) Patent No.: US 12,388,665 B2
(45) Date of Patent: Aug. 12, 2025

(54) VERIFICATION METHOD AND APPARATUS

(71) Applicant: Petal Cloud Technology Co., Ltd., Dongguan (CN)

(72) Inventor: Shuaihong Gao, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 313 days.

(21) Appl. No.: 17/928,192

(22) PCT Filed: May 26, 2021

(86) PCT No.: PCT/CN2021/095983
§ 371 (c)(1),
(2) Date: Nov. 28, 2022

(87) PCT Pub. No.: WO2021/238968
PCT Pub. Date: Dec. 2, 2021

(65) Prior Publication Data
US 2023/0102561 A1 Mar. 30, 2023

(30) Foreign Application Priority Data
May 27, 2020 (CN) .......................... 202010463614.9

(51) Int. Cl.
*H04L 9/40* (2022.01)
*G06V 30/194* (2022.01)
(Continued)

(52) U.S. Cl.
CPC ........ *H04L 63/0892* (2013.01); *G06V 30/194* (2022.01); *H04L 9/3273* (2013.01);
(Continued)

(58) Field of Classification Search
CPC ........ G07C 9/28; G07C 9/00182; G07C 9/00; G07F 15/04; G07F 15/005;
(Continued)

(56) References Cited

U.S. PATENT DOCUMENTS

2014/0123231 A1\* 5/2014 Low .................... H04L 63/0892
726/4
2014/0313010 A1 10/2014 Huang et al.
(Continued)

FOREIGN PATENT DOCUMENTS

CN 102270314 A 12/2011
CN 102673515 A 9/2012
(Continued)

*Primary Examiner* — Kyung H Shin
(74) *Attorney, Agent, or Firm* — Conley Rose, P.C.

(57) ABSTRACT

The method includes performing Bluetooth authentication with a terminal based on Bluetooth authentication information; after the Bluetooth authentication with the terminal succeeds, obtaining RFID authentication information, where the RFID authentication information includes label information and authorization information of an RFID label, and the authorization information is used to indicate an association relationship between the RFID label and the terminal; and performing RFID authentication based on the RFID authentication information, and being in a controllable state after the RFID authentication succeeds.

20 Claims, 10 Drawing Sheets

(51) Int. Cl.
*H04L 9/32* (2006.01)
*H04W 12/047* (2021.01)
*H04W 12/06* (2021.01)

(52) U.S. Cl.
CPC ....... *H04L 63/0838* (2013.01); *H04W 12/047* (2021.01); *H04W 12/06* (2013.01)

(58) Field of Classification Search
CPC ...... G07F 17/0057; G07F 15/00; B60L 50/50; H04L 63/0892; H04L 63/0884; H04L 63/0838; H04L 9/0861; H04L 9/3242; H04L 63/083; H04L 9/3271; H04L 63/0428; H04L 63/0853; H04L 63/06; H04L 63/0861; G06F 21/35; G06F 21/32; G06F 21/43; H04W 12/068; H04W 4/80; H04W 12/04; H04W 76/10; H04W 12/06; H04B 1/3833; G06V 30/194; G06V 40/174; G06V 30/19173; G06V 40/172; G06V 40/70; G06V 40/166; B60W 60/0015; B60R 25/305; B60R 25/24; B60R 25/25; B60R 25/102; B60R 25/40; B60R 25/2054; B60R 25/2045; B60R 21/01; G08B 21/0297; G08B 25/12
See application file for complete search history.

(56) References Cited

U.S. PATENT DOCUMENTS

| | | | |
|---|---|---|---|
| 2015/0188891 A1* | 7/2015 | Grange | H04L 63/0838 380/270 |
| 2015/0239357 A1 | 8/2015 | Huntzicker et al. | |
| 2018/0186897 A1 | 7/2018 | Lanzavecchia et al. | |
| 2018/0374290 A1 | 12/2018 | Bjorkengren | |
| 2020/0238952 A1* | 7/2020 | Lindsay | G06V 30/194 |

FOREIGN PATENT DOCUMENTS

| | | | | |
|---|---|---|---|---|
| CN | 103332170 A | 10/2013 | | |
| CN | 103856940 A | 6/2014 | | |
| CN | 104065407 A | 9/2014 | | |
| CN | 104527567 A | 4/2015 | | |
| CN | 106274807 A | 1/2017 | | |
| CN | 207752488 U | 8/2018 | | |
| CN | 109104403 A | 12/2018 | | |
| CN | 110363899 A | 10/2019 | | |
| EP | 2479731 B1 * | 9/2015 | ......... | G07C 9/00111 |
| JP | 2018036790 A | 3/2018 | | |
| JP | 2019108787 A | 7/2019 | | |
| JP | 2020076242 A | 5/2020 | | |

* cited by examiner

Detail C

VERIFICATION METHOD AND APPARATUS

CROSS-REFERENCE TO RELATED APPLICATIONS

This application is a national stage of International Application No. PCT/CN2021/095983, filed on May 26, 2021, which claims priority to Chinese Patent Application No.202010463614.9 filed on May 27, 2020. Both of the aforementioned applications are hereby incorporated by reference in their entireties.

TECHNICAL FIELD

Embodiments of this application relate to the field of control technologies, and in particular, to a verification method and apparatus.

BACKGROUND

With development of communications technologies, applications in a terminal are increasingly extensive. A Bluetooth digital key application is one of the applications in the terminal. A user may install the Bluetooth digital key application in a terminal used by the user, to implement operations such as using the terminal to control to open/lock a door of a vehicle and to start/stop an automobile motor.

Currently, in an application scenario in which a terminal controls a vehicle, the terminal is usually in an identifiable range of the vehicle. That is, the user can control the vehicle by using the terminal only when the terminal installed with the Bluetooth digital key application is within a specific range from the vehicle.

However, an existing relay attack manner can break through the distance limit, and transparently transmit stolen Bluetooth authentication information in the terminal to an identification apparatus that may be also referred to as an unlocking apparatus or the like of a vehicle. In this case, the identification apparatus of the vehicle considers that the terminal is within an identifiable range of the vehicle, and performs an operation such as opening a door or starting an automobile motor based on an indication of the terminal. Actually, a distance between the user and the vehicle may be 100 kilometers.

In the conventional technology, to resolve the foregoing problem, a relay attack is prevented by using a positioning system and with reference to location information of a vehicle and a terminal.

However, the conventional technology depends on the positioning system, and therefore cannot be used in some scenarios, for example, an underground garage.

SUMMARY

This application provides a verification method and apparatus, to effectively prevent a relay attack.

To achieve the foregoing objective, this application uses the following technical solutions.

According to a first aspect, an embodiment of this application provides a verification method. The method includes: performing Bluetooth authentication with a terminal based on Bluetooth authentication information; after the Bluetooth authentication with the terminal succeeds, obtaining RFID authentication information, where the RFID authentication information includes label information and authorization information of an RFID label, and the authorization information is used to indicate an association relationship between the RFID label and the terminal, and performing RFID authentication based on the RFID authentication information, and being in a controllable state after the RFID authentication succeeds.

In the foregoing implementation, dual authentication between a controlled device and the terminal is implemented, that is, the Bluetooth authentication and the RFID authentication. After the dual authentication succeeds, the controlled device is in a controllable state, for example, a user or the terminal is allowed to operate the controlled device. This can effectively prevent a relay attack and improve security of the controlled device.

In a possible implementation, the performing RFID authentication based on the RFID authentication information includes: performing the RFID authentication with the RFID label based on the RFID authentication information.

In the foregoing implementation, the RFID authentication between the controlled device and the RFID label is implemented, and after the RFID authentication succeeds, an action required by the user or the terminal is performed. This can effectively prevent a relay attack and improve security of the controlled device.

In a possible implementation, the RFID label stores the label information and the authorization information, and the performing RFID authentication based on the RFID authentication information includes: sending verification information and the obtained label information to the RFID label; receiving encrypted verification information sent by the RFID label, where the encrypted verification information is obtained after the RFID label encrypts the verification information based on the authorization information stored in the RFID label; and in response to the received encrypted verification information, decrypting the encrypted verification information based on the obtained authorization information, to obtain the verification information, and determining that the RFID authentication succeeds.

In the foregoing implementation, the controlled device and the terminal may exchange RFID authentication information, and a dual unlock manner based on the RFID authentication is implemented. This can effectively prevent a relay attack and improve security of the controlled device.

In a possible implementation, the receiving encrypted verification information sent by the RFID label includes: receiving a first part of the encrypted verification information sent by the RFID label; sending first indication information to the RFID label, to indicate the RFID label to send a second part of the encrypted verification information; and if the second part of the encrypted verification information sent by the RFID label is received within preset duration, determining that the encrypted verification information is successfully received.

In the foregoing implementation, limitation of the RFID protocol on response duration can effectively prevent a relay attack and improve security of the controlled device.

In a possible implementation, the RFID label stores the label information and the authorization information, and the performing RFID authentication based on the RFID authentication information includes: sending a request message to the RFID label, to indicate the RFID label to send the verification information of the RFID label and the label information stored in the RFID label; encrypting, based on the label information sent by the RFID label, the verification information by using the obtained authorization information, and sending the encrypted verification information to the RFID label; and in response to a received acknowledge message sent by the RFID label, determining that the RFID authentication succeeds.

In the foregoing implementation, the controlled device and the terminal may exchange RFID authentication information, and a dual unlock manner based on the RFID authentication is implemented. This can effectively prevent a relay attack and improve security of the controlled device.

In a possible implementation, the receiving the label information sent by the RFID label includes: receiving a first part of the label information sent by the RFID label; sending first indication information to the RFID label, to indicate the RFID label to send a second part of the label information; and if the second part of the label information sent by the RFID label is received within preset duration, determining that the label information is successfully received.

In the foregoing implementation, limitation of the RFID protocol on response duration can effectively prevent a relay attack and improve security of the controlled device.

In a possible implementation, the obtaining RFID authentication information includes: receiving the RFID authentication information sent by the terminal.

In the foregoing implementation, each time after receiving the RFID authentication information sent by the terminal, the controlled device may perform RFID authentication with the RFID label based on the RFID authentication information, so that a dual unlock manner based on RFID authentication is implemented. This can effectively prevent a relay attack and improve security of the controlled device.

In a possible implementation, the performing Bluetooth authentication with a terminal based on Bluetooth authentication information includes: sending Bluetooth authentication request information; and after receiving a Bluetooth authentication response message sent by the terminal, establishing a Bluetooth communication connection to the terminal, and when a distance from the terminal is less than or equal to a first threshold, performing the Bluetooth authentication with the terminal based on the Bluetooth authentication information.

In the foregoing implementation, a Bluetooth authentication process between the controlled device and the terminal is implemented, so that the controlled device can implement a dual unlock manner based on RFID authentication when Bluetooth authentication succeeds. This can effectively prevent a relay attack and improve security of the controlled device.

In a possible implementation, the label information includes at least one of the following: identification information of the RFID label and content information of the RFID label.

In the foregoing implementation, the controlled device may perform an RFID authentication process based on the identification information of the RFID label and/or the content information of the RFID label, so that a manner of dual unlock based on the RFID authentication is implemented. This can effectively prevent a relay attack and improve security of the controlled device.

In a possible implementation, the authorization information includes at least one of the following: signature information of the terminal and encrypted label information.

In the foregoing implementation, the controlled device may perform the process of the RFID authentication based on the authorization information, so that the manner of dual unlock based on the RFID authentication is implemented. This can effectively prevent a relay attack and improve security of the controlled device.

In a possible implementation, after the controlled device is in the controllable state, the method further includes: unlocking the controlled device, or starting the controlled device.

According to a second aspect, an embodiment of this application provides a verification method, including: performing Bluetooth authentication with a controlled device based on Bluetooth authentication information; and after the Bluetooth authentication with the controlled device succeeds, sending RFID authentication information to the controlled device, so that the controlled device performs RFID authentication based on the RFID authentication information, where the RFID authentication information includes label information and authorization information of an RFID label, and the authorization information is used to indicate an association relationship between the RFID label and a terminal.

In the foregoing implementation, dual authentication between the controlled device and the terminal is implemented, that is, the Bluetooth authentication and the RFID authentication. This can effectively prevent a relay attack and improve security of the controlled device.

In a possible implementation, before the performing Bluetooth authentication with an authentication device, the method further includes: authorizing the RFID label to obtain the RFID authentication information.

In the foregoing implementation, the terminal authorizes the RFID label to associate the RFID label with the terminal.

In a possible implementation, the authorizing the RFID label includes: receiving the label information sent by the RFID label; and sending the authorization information to the RFID label.

In the foregoing implementation, the terminal authorizes the RFID label to associate the RFID label with the terminal.

In a possible implementation, the label information includes at least one of the following: identification information of the RFID label and content information of the RFID label.

In a possible implementation, the authorization information includes at least one of the following: signature information of the terminal and encrypted label information.

According to a third aspect, an embodiment of this application provides a verification apparatus, including a memory and a processor. The memory is coupled to the processor; and the memory stores program instructions, and when the program instructions are executed by the processor, the apparatus is enabled to perform the method in any one of the first aspect or the possible implementations of the first aspect.

According to a fourth aspect, an embodiment of this application provides a verification apparatus, including a memory and a processor. The memory is coupled to the processor; and the memory stores program instructions, and when the program instructions are executed by the processor, the apparatus is enabled to perform the method in any one of the second aspect or the possible implementations of the second aspect.

According to a fifth aspect, an embodiment of this application provides a verification apparatus, including a controller and a transceiver. The controller and the transceiver communicate with each other through an internal link path, the controller is configured to execute instructions to control the transceiver to send or receive a signal, and when the controller executes the instructions, the verification apparatus is enabled to perform the method in any one of the first aspect or the possible implementations of the first aspect.

According to a sixth aspect, an embodiment of this application provides a verification apparatus, including a controller and a transceiver. The controller and the transceiver communicate with each other through an internal link path, the controller is configured to execute instructions to control the transceiver to send or receive a signal, and when the controller executes the instructions, the verification apparatus is enabled to perform the method in any one of the second aspect or the possible implementations of the second aspect.

According to a seventh aspect, an embodiment of this application provides a verification apparatus, including a Bluetooth authentication module, an obtaining module, and an RFID authentication module. The Bluetooth authentication module is configured to perform Bluetooth authentication with a terminal based on Bluetooth authentication information. The obtaining module is configured to: after the Bluetooth authentication with the terminal succeeds, obtain RFID authentication information, where the RFID authentication information includes label information and authorization information of an RFID label, and the authorization information is used to indicate an association relationship between the RFID label and the terminal. The RFID authentication module is configured to perform RFID authentication based on the RFID authentication information. After the RFID authentication succeeds, the controlled device is in a controllable state.

According to an eighth aspect, an embodiment of this application provides a verification apparatus, including a Bluetooth authentication module and a transceiver module. The Bluetooth authentication module is configured to perform Bluetooth authentication with a controlled device based on Bluetooth authentication information. The transceiver module is configured to: after the Bluetooth authentication with the controlled device succeeds, send RFID authentication information to the controlled device, to indicate the controlled device to perform RFID authentication based on the RFID authentication information, where the RFID authentication information includes label information and authorization information of an RFID label, and the authorization information is used to indicate an association relationship between the RFID label and a terminal.

According to a ninth aspect, an embodiment of this application provides a computer-readable storage medium, where the computer-readable storage medium stores a computer program, the computer program includes at least one segment of code, and the at least one segment of code can be executed by a verification apparatus, to control the verification apparatus to perform the method in any one of the first aspect or the possible implementations of the first aspect.

According to a tenth aspect, an embodiment of this application provides a computer-readable storage medium, where the computer-readable storage medium stores a computer program, the computer program includes at least one segment of code, and the at least one segment of code can be executed by a verification apparatus, to control the verification apparatus to perform the method in any one of the second aspect or the possible implementations of the second aspect.

According to an eleventh aspect, an embodiment of this application provides a computer program. The computer program includes instructions for performing the method according to any one of the first aspect or the possible implementations of the first aspect.

According to a twelfth aspect, an embodiment of this application provides a computer program. The computer program includes instructions for performing the method according to any one of the second aspect or the possible implementations of the second aspect.

According to a thirteenth aspect, an embodiment of this application provides a chip. The chip includes a processing circuit and a transceiver pin. The transceiver pin and the processing circuit communicate with each other through an internal connection path. The processing circuit performs the method according to any one of the first aspect or the possible implementations of the first aspect, to control a receive pin to receive a signal and a transmit pin to send a signal.

According to a fourteenth aspect, an embodiment of this application provides a chip. The chip includes a processing circuit and a transceiver pin. The transceiver pin and the processing circuit communicate with each other through an internal connection path. The processing circuit performs the method according to any one of the second aspect or the possible implementations of the second aspect, to control a receive pin to receive a signal and a transmit pin to send a signal.

According to a fifteenth aspect, an embodiment of this application provides a verification system. The system includes the terminal and the controlled device according to the first aspect and the second aspect.

BRIEF DESCRIPTION OF DRAWINGS

To describe technical solutions in embodiments of this application more clearly, the following briefly introduces accompanying drawings for describing embodiments of this application. It is clear that the accompanying drawings in the following description show merely some embodiments of this application, and a person of ordinary skill in the art may still derive other drawings from these accompanying drawings without creative efforts.

DESCRIPTION OF EMBODIMENTS

Figure 1:
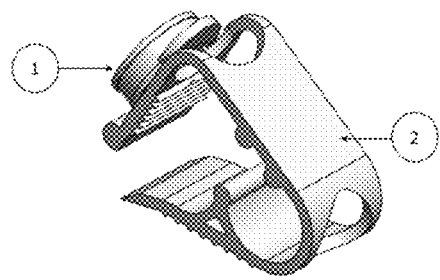
FIG. 1 is a schematic diagram of an example of a relay attack.

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first target object, a second target object, and the like are intended to distinguish between different target objects but do not indicate a particular order of the target objects.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the description of the embodiment of this application, unless otherwise stated, "a plurality of" means two or more than two. For example, a plurality of processing units are two or more processing units. A plurality of systems are two or more systems.

In descriptions of embodiments of this application, an example in which a controlled device is a vehicle is used for description. It should be noted that in another embodiment, the controlled device may alternatively be a device such as an intelligent lock or a ship.

To help a person skilled in the art better understand the technical solutions of this application, the related background is described in detail first. In the following description of the background, a terminal is a terminal installed with a Bluetooth digital key application. For ease of description, the terminal installed with a Bluetooth digital key application is referred to as a terminal for short in the following embodiments.

The Bluetooth technology is a low power-consuming communication mode. To be specific, even if the terminal and/or the vehicle keeps a Bluetooth function enabled, power consumption of the terminal and/or the vehicle is very low. In addition, the Bluetooth technology is a short-range wireless communication protocol. In a scenario in which two devices communicate through Bluetooth, data can be transmitted only within a reachable range of a Bluetooth signal. An existing keyless control manner is usually implemented based on the Bluetooth technology. Because the Bluetooth technology has features of low power consumption and short-range transmission, the vehicle and the terminal may enable a Bluetooth function in real time, and establish Bluetooth communication within a transmission range of the Bluetooth signal.

An unlocking process of a terminal in the conventional technology specifically includes: A user approaches the vehicle with the terminal, and the vehicle of the user may send a Bluetooth signal (also referred to as a search signal or a wake-up signal) in real time or periodically. After detecting the Bluetooth signal sent by the vehicle, the terminal establishes a Bluetooth communication connection to the vehicle, and the terminal performs Bluetooth authentication with the vehicle, for example, exchanges Bluetooth authentication information. After the Bluetooth authentication succeeds, the vehicle may perform a corresponding operation based on an instruction sent by the terminal, for example, unlocking (or opening) a vehicle door, opening a trunk, or starting an engine.

However, there may be a relay attack in an unlocking process based on Bluetooth communication. Specifically, relay (Relay) transmission means that a relay device transparently transmits, to a receive end, a signal sent by a transmit end. When the relay transmission is applied to an existing verification (that is, unlocking) scenario, the relay transmission is referred to as the relay attack. Details are as follows:

FIG. 1 is a schematic diagram of a relay attack. Refer to FIG. 1. A vehicle owner carries a terminal, and a distance between the vehicle owner and a vehicle is long. For example, the vehicle owner is in Shanghai, and the vehicle is in Beijing. An attacker A approaches the vehicle owner with a terminal A (referred to as a relay device A below). The relay device A may obtain Bluetooth authentication information of the terminal of the vehicle owner, and transparently transmit, over a wireless network, the obtained Bluetooth authentication information to a terminal B (referred to as a relay device B below) held by an attacker B. The relay device B sends the obtained Bluetooth authentication information to the vehicle. Correspondingly, Bluetooth authentication information sent by the vehicle to the terminal of the vehicle owner may also be sent to the terminal of the vehicle owner through the relay device B and the relay device A, to implement a Bluetooth authentication process between the terminal and the vehicle. The vehicle and the terminal may determine, based on the Bluetooth authentication information obtained by the vehicle and the terminal, that Bluetooth authentication succeeds, and the vehicle is unlocked. In other words, the relay devices, including the relay device A and the relay device B, may forge an unlock event through transparent transmission. Consequently, the terminal considers that the vehicle is nearby, and the vehicle considers that the terminal is nearby, resulting in the vehicle being stolen.

Figure 2:
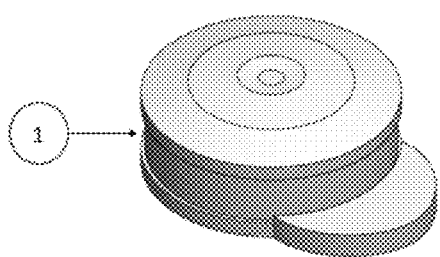
FIG. 2 is a schematic diagram of an example of an anti-theft manner.

For the foregoing problem, the conventional technology further provides an anti-theft manner. The anti-theft manner uses geographical location information of the vehicle and the terminal. Specifically, FIG. 2 is a schematic diagram of the conventional technology. For example, the vehicle establishes a Bluetooth communication connection to the terminal, and then the vehicle and the terminal exchange Bluetooth authentication information, to perform a Bluetooth authentication process. In the Bluetooth authentication process, after the Bluetooth authentication between the vehicle and the terminal succeeds, to avoid a relay attack, the terminal further obtains a current address location of the vehicle from the vehicle, where the address location may be longitude and latitude. The terminal compares an obtained current geographical location of the vehicle with a geographical location stored by the terminal when an engine of the vehicle is cut. This may be understood as a secondary authentication. If a discrepancy between the two geographical locations is within an allowed range, the secondary authentication succeeds, and the terminal may control the vehicle. For example, the vehicle may unlock the vehicle door in response to an unlock instruction sent by the terminal.

Although the conventional technology can prevent the relay attack, the terminal needs to obtain the geographical location information of the vehicle, that is, depends on a global positioning system (Global Positioning System. GPS) and a network signal. Therefore, in a scenario with a poor signal or without GPS coverage such as in a basement, the terminal may not obtain the location information of the vehicle and the geographical location information of the vehicle when the engine of the vehicle is cut. In addition, a determining manner based on the geographical location information may cause misjudgment, and the user cannot normally use the vehicle.

For the problems in the conventional technology, this application provides a verification method. In a process of interaction between a terminal and a controlled device (or referred to as an unlocking device), reading of a radio frequency identification (Radio Frequency Identification, RFID) label may be used, where the RFID label is authorized by the terminal. In this way, a communication distance constraint of the RFID label is used to avoid a risk of a relay attack in a verification process through wireless communication such as Bluetooth. It should be noted that, in descriptions of the following embodiments of this application, the terminal is a terminal installed with a Bluetooth digital key application. For ease of description, the terminal installed with a Bluetooth digital key application is referred to as a terminal for short in the following embodiments. The Bluetooth digital key application in embodiments of this application may be an updated version of the Bluetooth digital key application in the conventional technology, or may be another Bluetooth digital key application that can perform the solution in embodiments of this application. It should be further noted that the Bluetooth digital key application may be an application downloaded by the user on the terminal, or may be a pre-installed application of the terminal before delivery. This is not limited in this application.

Figure 3:
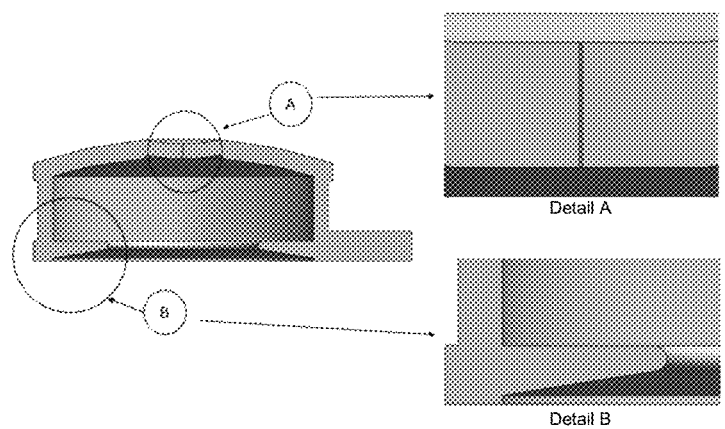
FIG. 3 is a schematic diagram of a communication system according to an embodiment of this application.

Before the technical solutions in embodiments of this application are described, a communication system in embodiments of this application is first described with reference to the accompanying drawings. FIG. 3 is a schematic diagram of a communication system according to an embodiment of this application. The communication system includes a terminal, an RFID label, and a vehicle. It should be noted that, in actual application, there may be one or more terminals, RFIDs, and vehicles. A quantity of devices in the communication system shown in FIG. 3 is merely an adaptive example. This is not limited in this application.

The following describes in detail functions and features of each device in FIG. 3.

(1) RFID Label

RFID is a technology in which data is automatically identified and obtained, and a target can be identified by contactless bidirectional data communication through radio frequency. The RFID technology is implemented based on the RFID label and an RFID reader.

The RFID label stores label information, and the label information includes identification information, or includes identification information and label content information. The identification information is used to uniquely identify the RFID label, the label content information is used to record content stored in the label, and both the identification information and the label content information are binary data.

Figure 4:
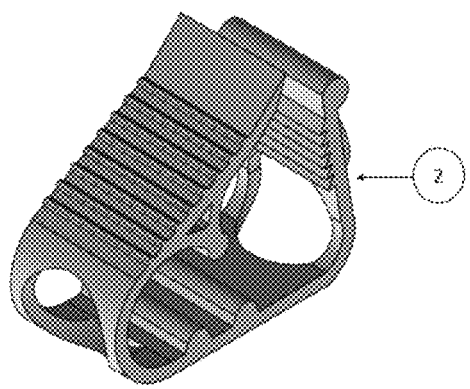
FIG. 4 is a schematic diagram of an example of an RFID label.

In an example, the RFID label may be in a form of a card. As shown in FIG. 4, the RFID label card may be attached or hung on any position of the terminal. In another example, if the terminal is a wearable device such as a smartwatch or a smart band, the RFID label may also be embedded in or attached on any part of the watch or the band, for example, a watch strap. It should be noted that, in this application, a verification process is performed with reference to RFID reading. Therefore, the RFID label needs to collaborate with the terminal to perform the verification process. In other words, a user needs to carry both the RFID label and the terminal, or it may be understood that the RFID label and the terminal need to be within a specific range, for example, within 1 meter, to complete verification.

In another example, the RFID label may alternatively be integrated into the terminal. For example, the RFID label may be integrated into a chip in which a processor of the terminal is located, and is connected to the processor over a bus; the RFID label may alternatively be outside the chip, and is connected to the processor of the terminal through an interface.

Interaction between the RFID label and the RFID reader complies with the RFID protocol. The RFID protocol specifies that a response time between the RFID label and the RFID reader is 86 µs or 91 µs. To be specific, the RFID prevents a relay attack by using a distance constraint protocol based on a communication time between the RFID label and the RFID card reader. Specific application of the protocol is described in detail in the following embodiments.

For example, the RFID reader may also be referred to as an RFID receive end, an RFID card reader, or an RFID measurement reader/writer. This is not limited in this application.

(2) Terminal

Figure 5:
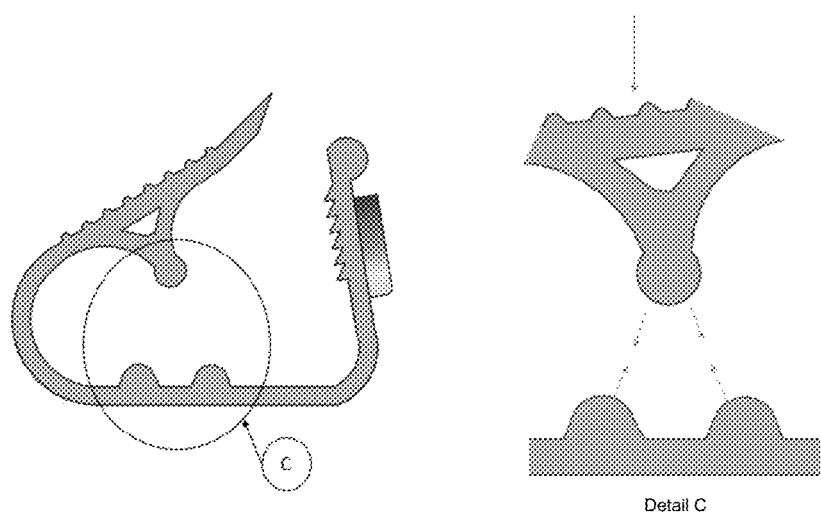
FIG. 5 is a schematic diagram of a structure of an example of a terminal.

For example, FIG. 5 is a schematic diagram of a structure when the terminal is a mobile phone. A mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 1803, a touch sensor 180K, an ambient light sensor 180L, a bone conduction sensor 180M, and the like.

It may be understood that the structure illustrated in embodiments of this application does not constitute a specific limitation on the mobile phone 100. In other embodiments of this application, the mobile phone 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the mobile phone 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The USB interface 130 is an interface complying with a USB standard.

It may be understood that an interface connection relationship between the modules shown in this embodiment of this application is merely an example for description, and does not constitute a limitation on the structure of the mobile phone 100. In some other embodiments of this application, the mobile phone 100 may alternatively use a manner of the interface connection different from that in the foregoing embodiment, or use a combination of a plurality of manners of the interface connection.

The charging management module 140 is configured to receive a charging input from the charger. The charging management module 140 may further supply power to the mobile phone by using the power management module 141 while charging the battery 142.

The power management module 141 is configured to connect the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like.

A wireless communication function of the mobile phone 100 may be implemented by using the antenna 1, the antenna 2, the mobile communications module 150, the wireless communications module 160, the modem processor, the baseband processor, and the like.

The mobile phone 100 may implement an audio function such as music playing or recording by using the audio module 170, the loudspeaker 170A, the telephone receiver 170B, the microphone 170C, the headset jack 170D, the application processor, and the like.

The audio module 170 is configured to convert digital audio information into an analog audio signal for output, and is also configured to convert analog audio input into a digital audio signal. The speaker 170A, also referred to as a "loudspeaker", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal.

The mobile phone 100 implements a display function by using the GPU, the display 194, the application processor, and the like. The processor 110 may include one or more GPUs, which execute program instructions to generate or change display information.

The display 194 is configured to display an image, a video, or the like. The display 194 includes a display panel. In some embodiments, the mobile phone 100 may include one or N displays 194. Herein, N is a positive integer greater than 1.

The mobile phone 100 may implement a photographing function by using the ISP, the camera 193, the video codec, the GPU, the display 194, the application processor, and the like.

The camera 193 is configured to capture a static image or a video.

The external memory interface 120 may be configured to connect to an external storage card such as a micro SD card, to extend a storage capability of the mobile phone 100.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, and an application required by one or more functions, for example, the Bluetooth digital key application in this application. The data storage area may store data (such as audio data and contacts) and the like created during use of the mobile phone 100. In addition, the internal memory 121 may include a high-speed random access memory, and may further include a nonvolatile memory, for example, one or more magnetic disk storage devices, a flash memory, a universal flash storage (universal flash storage, UFS), or the like.

The wireless communications module 160 may provide a solution to wireless communication applied to the mobile phone 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the mobile phone 100. The mobile phone 100 may support one or N SIM card interfaces, where N is a positive integer greater than 1.

(3) Vehicle

Figure 6:
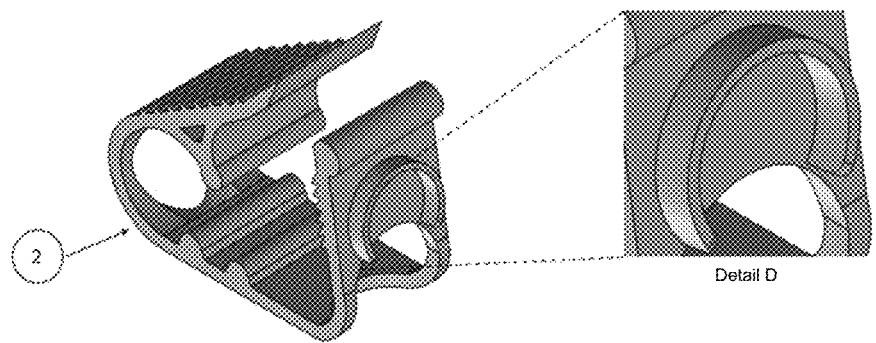
FIG. 6 is a schematic diagram of an example of a frame of a vehicle.

Specifically, FIG. 6 is a schematic diagram of a frame of a vehicle 200 according to this application. For example, the vehicle includes but is not limited to a microcontroller unit (microcontroller unit, MCU) 201, a Bluetooth module 202, a vehicle security module 203, an RFID reader 204, and a body control module (Body Control Module. BCM) 205.

Specifically, in this application, the MCU 201 is a coprocessor configured to obtain and process data from a Bluetooth chip. The MCU 201 has a small processing capability and low power consumption, and has an "always on (always on)" feature.

The Bluetooth module 202 is configured to implement short-range wireless communication between the vehicle and another terminal device (for example, a mobile phone or a smartwatch). The short range may be 200 meters, 20 meters, or the like. A specific example depends on a wireless communication capability between the Bluetooth module 202 and the terminal that communicates with the Bluetooth module 202. This is not limited in this application.

Optionally, a module configured to implement wireless communication in the vehicle may further include a Wi-Fi module (not shown in the figure). It should be noted that, in embodiments of this application, only an embodiment of Bluetooth transmission with reference to RFID reading is used as an example for description. In another embodiment, the terminal and the verification device, for example, the vehicle, may exchange data through Wi-Fi or another wireless transmission protocol, to perform a Bluetooth authentication process, and perform RFID reading based on the foregoing wireless transmission protocol, to prevent a relay attack. A specific manner is similar to the verification manner in embodiments of this application, and details are not described in this application again. Still refer to FIG. 6. The Bluetooth module 202 is configured to implement short-range communication between the vehicle and another terminal device (for example, a mobile phone or a smartwatch).

Still refer to FIG. 6. The vehicle security module 203 is configured to store authentication information, for example, Bluetooth authentication information. The Bluetooth authentication information is information required when Bluetooth authentication is performed between the vehicle and the terminal. The Bluetooth authentication information is configured before delivery of the vehicle. In addition, corresponding Bluetooth authentication information is also configured in the terminal. The Bluetooth authentication information configured in the terminal is in a one-to-one correspondence with the Bluetooth authentication information configured in the vehicle. For example, the Bluetooth authentication information may be signature information of the terminal. That is, both the terminal and the vehicle store the signature information. For example, the Bluetooth authentication information may be key information. It should be noted that key information stored in the vehicle security module 203 may be a symmetric key, or may be an asymmetric key. For example, the terminal stores a private key, the vehicle security module 203 of the vehicle stores a public key, and the public key and the private key forms a key pair. The terminal may encrypt information based on the key, and the vehicle may decrypt the encrypted information based on the public key. For another example, the terminal stores a key, and the vehicle security module 203 also stores the key. The terminal may encrypt information based on the key, and the vehicle may decrypt encrypted information based on the key stored in the vehicle security module 203. It may be understood that, in this application, the Bluetooth authentication information is actually used to prove that the terminal uniquely matches the vehicle, and only a terminal and a vehicle that hold corresponding Bluetooth authentication information can complete a Bluetooth authentication process.

Optionally, the Bluetooth authentication information may also be referred to as decryption information, unlocking information, verification information, pairing information, or the like. This is not limited in this application.

The RFID reader 204 is configured to read information sent by an RFID label. A specific interaction process is described in detail in the following embodiment.

The BCM 205 is configured to control each electronic device in the vehicle. For example, the BCM 205 may perform a corresponding operation based on an instruction delivered by the MCU. For example, if the MCU determines that dual authentication succeeds, that is, the Bluetooth authentication between the vehicle and the terminal succeeds, and RFID authentication between the vehicle and the RFID label succeeds, the MCU may send a trigger signal to the BCM 205 to activate the BCM 205. After the BCM 205 is activated, a user is allowed to start the vehicle and/or the user is allowed to open a vehicle door.

Optionally, the MCU 201, the Bluetooth module 202, the vehicle security module 203, the RFID reader 204, and/or the BCM 205 may be integrated into a same chip, or may be separate elements, and are connected through a bus.

Optionally, FIG. 6 is merely an example. In an actual product, a memory may be included, and code stored in the memory has a function of the vehicle security module 203. In addition, other functions of the memory belong to the conventional technology, and details are not described herein.

With reference to the foregoing schematic diagram of the communication system shown in FIG. 3, the following describes specific implementation solutions of this application.

Specifically, implementation of the verification solution in this application is mainly divided into two phases. The first phase is a preparation phase, including a pre-pairing process between a terminal, to be specific, the terminal on which a Bluetooth digital key application is installed and a vehicle, and an authorization process between the terminal and an RFID label. The second phase is an unlocking phase, to be specific, an unlocking process between the terminal and the vehicle. The following separately describes the foregoing two phases in detail.

The first phase is the preparation phase.

(1) The Pre-Pairing Process Between the Vehicle with the Terminal:

Specifically, in this application, Bluetooth authentication information is configured before delivery of the vehicle, and the Bluetooth authentication information is stored in the vehicle security module 203. After picking up the vehicle, the user may install the Bluetooth digital key application on the terminal of the user. After the Bluetooth digital key application is installed on the terminal, the user may log in to the Bluetooth digital key application by using pre-obtained login information, for example, login information provided by a manufacturer. After the login succeeds, the terminal may obtain Bluetooth authentication information. The Bluetooth authentication information corresponds to the Bluetooth authentication information stored in the vehicle. It can be understood that when the terminal successfully obtains the Bluetooth authentication information, the vehicle and the terminal are successfully paired.

For example, in this embodiment, an example in which the Bluetooth authentication information stored in the vehicle and the terminal is symmetric key information is used for description.

(2) The Authorization Process Between the Terminal and the RFID Label:

Specifically, the user may purchase the RFID label, or the manufacturer of the vehicle provides the RFID label, and the RFID label stores label information. In this embodiment, an example in which the RFID label is an RFID card and the label information is identification information is used for description.

Figure 7:
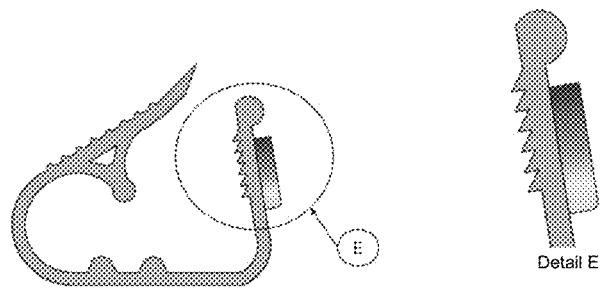
FIG. 7 is a schematic diagram of an example of a user operation.

For example, after obtaining the RFID label, the user may attach the RFID label to a phone case of the terminal, or hang the RFID label on the terminal. This is not limited in this application. For example, after the RFID label approaches the terminal, an NFC module of the terminal may sense existence of the RFID label. After detecting existence of the RFID label by using the NFC module, the terminal may perform an authorization operation on the RFID label with permission of the user, as shown in FIG. 7.

Figure 8:
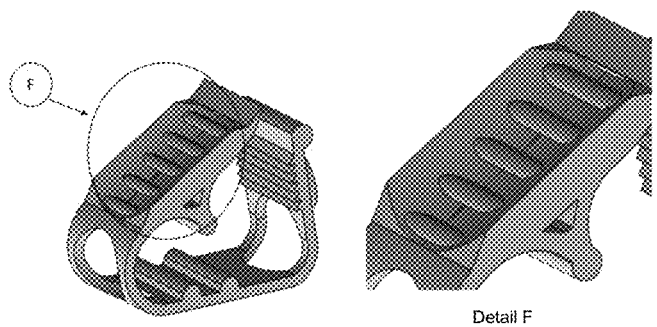
FIG. 8 is a schematic diagram of an example of an authorization process between a terminal and an RFID label.

FIG. 8 shows an authorization process between the terminal and the RFID label. Refer to FIG. 8. The process specifically includes the following steps.

(1) The Terminal Obtains the Label Information of the RFID Label.

Specifically, the Bluetooth digital key application on the terminal may invoke the NFC module (not shown in the figure) in the wireless communications module 160 of the terminal to interact with the RFID label, for example, read the label information of the RFID label. As described above, in this embodiment, an example in which the label information includes identification information is used for description.

The terminal may write the RFID label information, that is, the identification information, into the terminal. In an example, the terminal may write the read identification information into a specified storage area of the terminal, and the storage area is used to store secured information of the terminal, that is, information that cannot be read by another terminal. In another example, the terminal may write the read identification information into a storage area to which the application belongs. In addition, to ensure information security, the terminal may encrypt or sign the identification information, and store the encrypted or signed identification information in the storage area to which the application belongs.

(2) The Terminal Writes Authorization Information Into the RFID Label.

Specifically, the terminal may write the authorization information into the RFID label. For example, the authorization information may be signature information of the terminal, for example, identification information of the terminal, for example, a device ID. For example, the authorization information may be information encrypted based on a key of the terminal, and the key is the Bluetooth authentication information in the foregoing description. For example, the authorization information may alternatively be the signature information and information encrypted based on the key of the terminal. That is, in this application, the terminal writes authorization information uniquely corresponding to the terminal into the RFID label, to associate the RFID label with the terminal.

Figure 9:
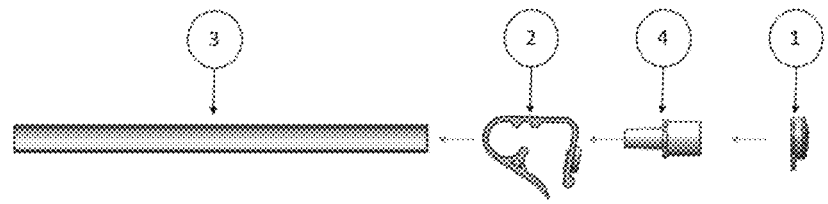
FIG. 9 is a schematic diagram of an example of RFID authentication information stored in an RFID label.

For example, the authorization information is identification information (Identity, ID) (encrypted ID for short) encrypted based on a key of the terminal. Specifically, the terminal encrypts the obtained identification information based on the key to obtain an encrypted ID, and writes the encrypted ID into the RFID label. As shown in FIG. 9, the RFID label currently stores the label ID and the encrypted ID.

Figure 10:
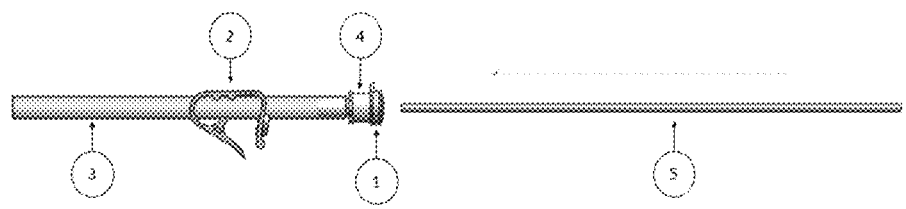
FIG. 10 is a schematic diagram of an example of RFID authentication information stored in an RFID label.

For example, the authorization information is an ID of the terminal (terminal ID for short) and the identification information (encrypted ID for short) encrypted based on the key of the terminal. Specifically, the terminal encrypts the obtained identification information based on the key to obtain the encrypted ID, and writes the encrypted ID and the terminal ID into the RFID label. As shown in FIG. 10, the RFID label currently stores the label ID, the terminal ID, and the encrypted ID.

The second phase is the unlocking process.

Figure 11:
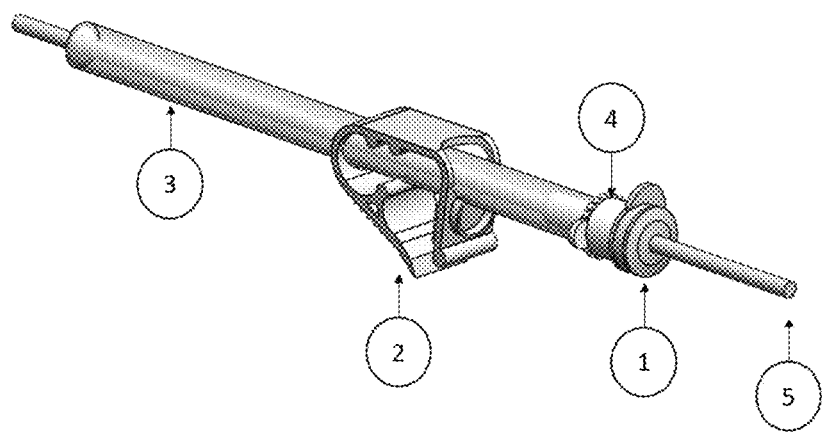
FIG. 11 is a schematic flowchart of a verification method according to an embodiment of this application.

With reference to FIG. 2, FIG. 11 is a schematic flowchart of a verification method according to an embodiment of this application. FIG. 11 includes the following steps.

Step 101: The terminal performs Bluetooth authentication with the vehicle.

Specifically, after the preparation phase is completed, the user approaches the vehicle with the terminal on which the Bluetooth digital key application is installed and the RFID label is attached. For example, the vehicle sends a Bluetooth broadcast signal periodically or in real time, and the Bluetooth broadcast signal may also be referred to as a search signal or a wake-up signal. After detecting the Bluetooth broadcast signal, the terminal may perform the Bluetooth authentication (or may be referred to as pairing) with the vehicle.

For example, a Bluetooth authentication process between the terminal and the vehicle includes but is not limited to a process in which the terminal and the vehicle exchange Bluetooth authentication information (for details, refer to the foregoing description of the vehicle), if the Bluetooth authentication information is successfully matched, the vehicle or the terminal determines that the Bluetooth authentication is completed, and after determining that the Bluetooth authentication is completed, the vehicle or the terminal may notify a peer end that the Bluetooth authentication is completed. It should be noted that a device for determining whether the Bluetooth authentication is completed may be the vehicle, or may be the terminal. This is not limited in this application. In addition, for specific details of the Bluetooth authentication between the vehicle and the terminal, refer to the conventional technology. This is not limited in this application.

Optionally, due to a transmission distance limit of a Bluetooth signal, the Bluetooth authentication between the terminal and the vehicle is limited in distance. For example, the terminal needs to receive the Bluetooth broadcast signal of the vehicle within 100 meters away from the vehicle, and performs the Bluetooth authentication with the vehicle after a Bluetooth connection is established. In a possible implementation, an example in which a maximum sensing distance between the vehicle and the terminal is 100 meters is used for description. For example, the user approaches the vehicle with the terminal within 100 meters. After receiving the Bluetooth broadcast signal sent by the vehicle, the terminal may establish the Bluetooth communication connection to the vehicle. After the Bluetooth communication connection is successfully established, the terminal may measure a distance based on the Bluetooth broadcast signal of the vehicle, to obtain the distance between the terminal and the vehicle. If the distance between the terminal and the vehicle falls within a Bluetooth authentication range, for example, 30 meters, the terminal and the vehicle perform a Bluetooth authentication process.

In a possible implementation, after the Bluetooth authentication between the terminal and the vehicle succeeds, the terminal may send an unlock instruction to the vehicle. It should be noted that because RFID authentication described below is not completed, the vehicle does not execute the unlock instruction.

Figure 12:
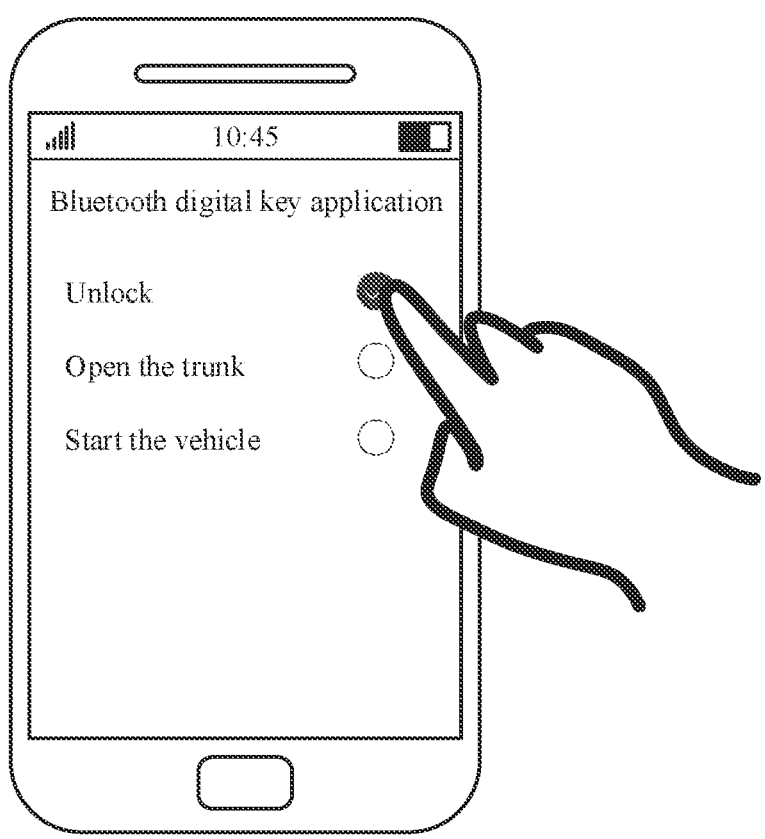
FIG. 12 is a schematic diagram of an example of a user operation.

In another possible implementation, an example in which a maximum sensing distance between the vehicle and the terminal is 100 meters is still used for description. For example, the user approaches the vehicle with the terminal within 100 meters, the vehicle may establish the Bluetooth connection to the terminal, and the user may control the terminal to remotely control the vehicle, as shown in FIG. 12. It should be noted that, because the vehicle does not complete the Bluetooth authentication and RFID authentication described below, the vehicle temporarily does not execute an instruction delivered by the user by using the terminal, but only stores the instruction, and executes the instruction after the dual authentication is completed.

Step 102: The terminal sends RFID authentication information to the vehicle.

Figure 13:
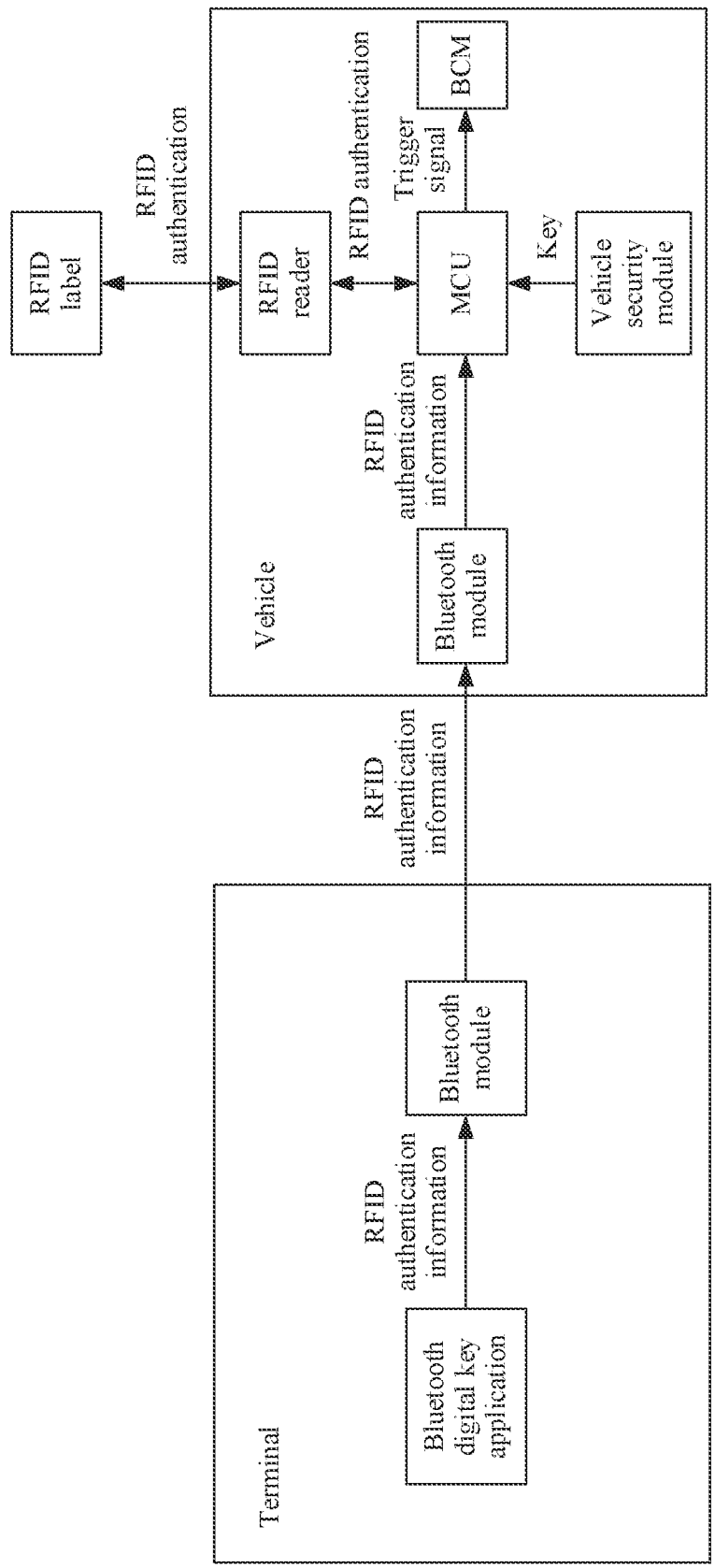
FIG. 13 is a schematic diagram of an example of interaction between a terminal, a vehicle, and an RFID label.

Specifically, FIG. 13 is a schematic diagram of interaction between the terminal, the vehicle, and the RFID label. Refer to FIG. 13. The terminal sends the RFID authentication information to the vehicle.

For example, the RFID authentication information includes identification information and authorization information of the RFID label. For example, the RFID authentication information includes the label ID (that is, the identification information of the RFID label) and the encrypted ID (that is, the authorization information), or includes the label ID, the encrypted ID, and the terminal ID.

For example, the terminal invokes a Bluetooth module in the terminal to send the foregoing information to the vehicle.

It should be further noted that a transmission distance of the Bluetooth signal may be the same as or different from a transmission distance of the RFID signal, that is, the radio frequency signal.

Optionally, the RFID authentication information in step 102 may be sent at each unlock. To be specific, the terminal sends the RFID authentication information to the vehicle each time after performing the Bluetooth authentication in step 101 with the vehicle. Optionally, the RFID authentication information in step 102 may also be sent to the vehicle after the preparation phase is completed. In this embodiment, after the Bluetooth authentication between the terminal and the vehicle succeeds, the vehicle may determine the corresponding RFID authentication information based on the identification information of the terminal. That is, when the vehicle corresponds to a plurality of terminals, the RFID authentication information may be sent to the vehicle after each Bluetooth authentication (RFID authentication information of different terminals is different). Alternatively, the RFID authentication information may be sent to the vehicle in the preparation phase, and the identification information of the terminal is sent to the vehicle in the Bluetooth authentication process or after the Bluetooth authentication is completed, so that the vehicle obtains the RFID authentication information corresponding to the terminal.

In a possible implementation, the terminal may encrypt the RFID authentication information and then send the encrypted RFID authentication information to the vehicle. For example, in this embodiment, an example in which the terminal encrypts the RFID authentication information based on the Bluetooth authentication information, and sends the encrypted RFID authentication information to the vehicle is used for description.

It should be noted that a key, an algorithm, and/or signature information used for encryption in this application, for example, a key used for encrypting the label ID when the authorization information is generated in the foregoing description, or a key used for encrypting the RFID authentication information in this step (step 102), are pre-configured by the terminal and the vehicle, and are stored in respective memories. It should be further noted that the key used for encryption may be the Bluetooth authentication information described in this application.

Step 103: The vehicle performs the RFID authentication with the RFID label.

Still refer to FIG. 13. After receiving the RFID authentication information sent by the terminal by using the Bluetooth module, the vehicle, specifically an MCU, may perform the RFID authentication with the RFID label based on the RFID authentication information.

In a possible implementation, the RFID authentication information sent by the terminal may be information encrypted based on the Bluetooth authentication information. After obtaining the encrypted RFID authentication information, the MCU may obtain, from a vehicle security module (or the memory), the Bluetooth authentication information used for decryption, and decrypt the received encrypted RFID authentication information, to obtain the original RFID authentication information. Subsequently, the MCU may perform an RFID authentication process with the RFID label through an RFID reader based on the RFID authentication information.

The following describes the RFID authentication process in detail.

Figure 14:
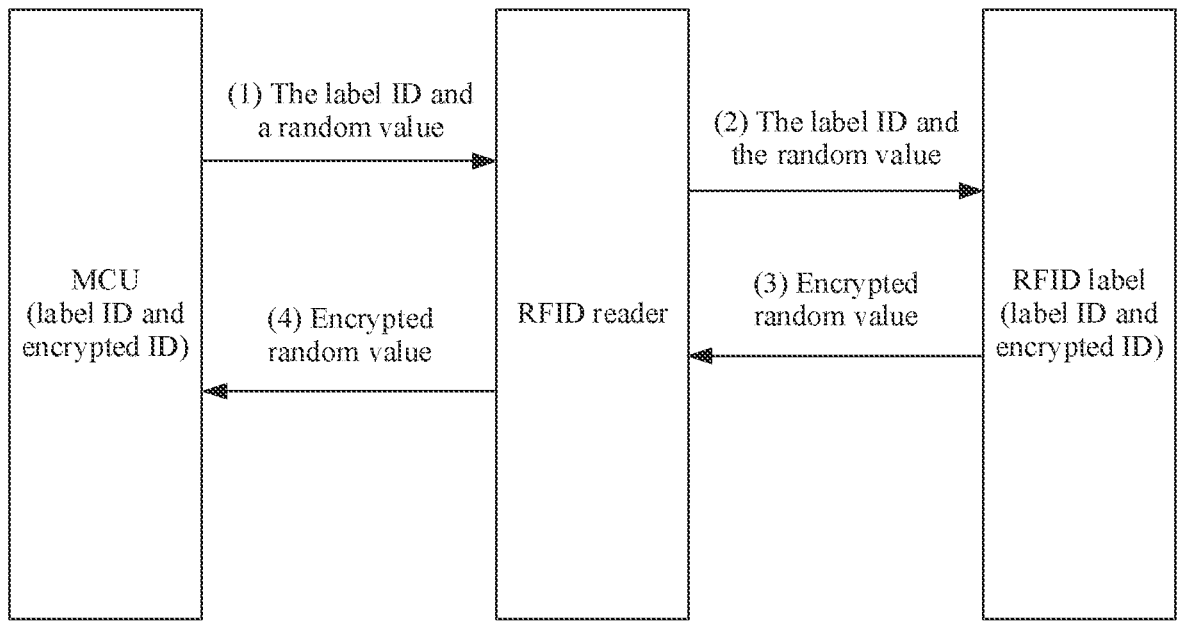
FIG. 14 is a schematic diagram of an example of an RFID authentication process.

With reference to the embodiment shown in FIG. 9, FIG. 14 is a schematic flowchart of an example of the RFID authentication process. Refer to FIG. 14. The process specifically includes the following steps.

(1) The MCU sends the label ID and a random value to the RFID reader. For example, the random value is any value generated by the MCU. In this embodiment, the MCU has obtained the label ID and the encrypted ID, that is, the RFID authentication information, from the terminal.

(2) The RFID reader sends the label ID and the random value to the RFID label. For example, the RFID reader sends a request message in real time or periodically. The request message carries the label ID and the random value. The request message may also be considered as a search signal. The user approaches the vehicle with the RFID label and enters a transmission range of the RFID signal, and the RFID label may receive the request message sent by the RFID reader.

(3) The RFID sends an encrypted random value to the RFID reader. Specifically, after receiving the label ID, the RFID label may determine that the received request message is sent to the RFID label, and the RFID label may encrypt the random value based on the encrypted ID to obtain an encrypted random value, and send the encrypted random value to the RFID reader.

(4) The RFID reader sends the encrypted random value to the MCU. Specifically, the MCU decrypts the encrypted random value based on the encrypted ID to obtain the original random value. The MCU compares the obtained random value with the random value generated in step (1), and if they are consistent, the MCU determines that the RFID authentication succeeds. If the decryption fails or the two random values are inconsistent, the MCU determines that the RFID authentication fails.

Figure 15:
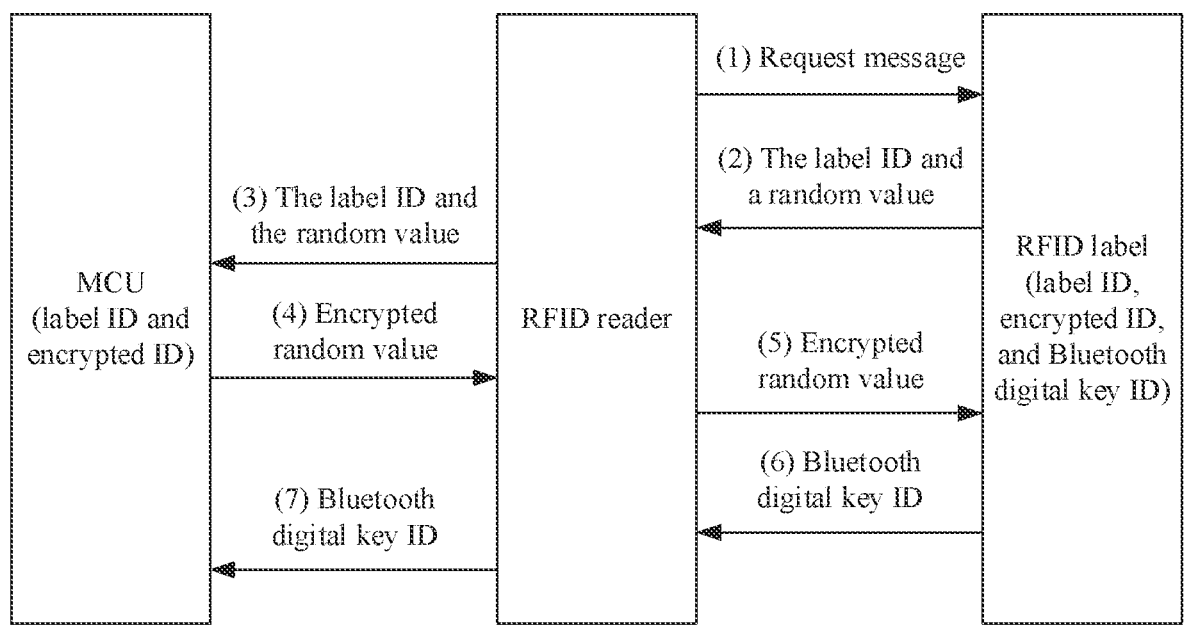
FIG. 15 is a schematic diagram of an example of an RFID authentication process.

With reference to the embodiment shown in FIG. 10, FIG. 15 is a schematic flowchart of an example of the RFID authentication process. Refer to FIG. 15. The process specifically includes the following steps.

(1) The RFID reader sends a request message to the RFID label. For example, the RFID reader sends the request message in real time or periodically. It should be noted that, based on a principle of the RFID technology, the RFID label does not generate a radio frequency signal, and can only reflect a radio frequency signal from the external environment, for example, reflect to-be-sent data to the RFID reader based on the request message (that is, the radio frequency signal) sent by the RFID reader.

(2) The RFID label sends the label ID and a random value to the RFID reader.

(3) The RFID reader sends the label ID and the random value to the MCU.

(4) The MCU sends an encrypted random value to the RFID reader. Specifically, after receiving the label ID and the random value, the MCU may obtain the corresponding encrypted ID based on the label ID. Then, the MCU encrypts the random value based on the encrypted ID to obtain an encrypted random value, and sends the encrypted random value to the RFID reader.

(5) The RFID reader sends the encrypted random value to the RFID label.

(6) The RFID label sends the terminal ID to the RFID reader. Specifically, after receiving the encrypted random value, the RFID label decrypts the encrypted random value based on the encrypted ID to obtain the original random value, and compares the original random value with the random value generated in step (1). If they are consistent, the RFID label information sends the terminal ID to the RFID reader.

(7) The RFID reader sends the terminal ID to the MCU. For example, the MCU may obtain the terminal ID from the terminal, that is, the terminal ID is included in the RFID authentication information. For example, the terminal ID may also be pre-stored in the vehicle security module. Specifically, after receiving the terminal ID sent by the RFID reader, the MCU compares the terminal ID with the obtained terminal ID, and if they are consistent, the MCU determines that the RFID authentication succeeds.

It should be noted that the interactions between the RFID reader and the RFID label shown in FIG. 14 and FIG. 15 are interactions at an application layer. Actually, the RFID reader and the RFID label perform a plurality of interactions at a protocol layer to transmit required data. In an example of FIG. 14, in a process in which the RFID reader obtains the encrypted random value sent by the RFID label, the encrypted random value may be divided into a plurality of data packets for sending. Each time obtaining a data packet, the RFID reader may send a response message to the RFID label, to indicate the RFID label to continue to send a next data packet. In the interaction process between the RFID reader and the RFID label, each time the RFID reader sends a piece of information, such as information indicating the RFID label to continue sending the next data packet, if the RFID reader does not receive the information returned by the RFID label within response duration specified in the protocol, such as 86 µs or 91 µs, the RFID reader determines that the response times out, this connection fails, and the RFID reader does not continue the subsequent RFID authentication process with the RFID label. In this case, to enable the RFID authentication of the RFID reader and the RFID label to succeed, the RFID reader and the RFID label need to re-perform the RFID authentication process.

For example, if the transmission distance of the Bluetooth signal is greater than the transmission distance of the radio frequency signal, after the terminal enters a sensing distance of the vehicle, that is, when the terminal can detect the Bluetooth broadcast signal of the vehicle, the terminal may perform the Bluetooth authentication process in step 101 with the vehicle. However, because the transmission distance of the Bluetooth signal is greater than the transmission distance of the radio frequency signal, after the Bluetooth authentication between the terminal and the vehicle is completed, a distance between the vehicle and the terminal is still long, for example, 20 meters, the RFID authentication between the terminal and the vehicle always fails. In this scenario, in an example, the terminal may remind the user that the RFID authentication distance is not reached currently. In another example, to implement senseless remote control, when the user observes that the vehicle is not unlocked or started based on an operation instruction from the user, the user may approach the vehicle until the user enters a transmission and authentication range of the RFID signal.

Step 104: The vehicle performs an operation based on the instruction sent by the terminal.

Specifically, after the dual authentication succeeds, that is, after the Bluetooth authentication between the terminal and the vehicle succeeds and the RFID authentication between the vehicle and the RFID label succeeds, the vehicle is in a controllable state. For example, the vehicle may perform the corresponding operation based on the instruction sent by the terminal.

As described above, for example, the instruction may be sent by the terminal to the vehicle in step 101. After receiving the instruction, the vehicle performs the corresponding operation based on the instruction when the dual authentication succeeds.

For example, after the dual authentication is completed, the vehicle may send an authentication success message to the terminal, and the terminal may send the instruction to the vehicle, to control the vehicle to perform the corresponding operation. The instruction may be automatically sent by the terminal, or may be triggered by the user. This is not limited in this application.

Optionally, the instruction may be at least one of the following: an unlock instruction, an engine starting instruction, a trunk opening instruction, a window opening instruction, or the like. This is not limited in this application.

For example, still refer to FIG. 13. If the MCU receives, from the RFID reader, indication information indicating that the RFID authentication succeeds, the MCU may send a trigger signal to the BCM to activate the BCM. After being activated, the BCM may further perform an operation such as opening a vehicle door, starting an engine, or opening a trunk based on a control signal sent by the MCU.

In the conventional technology, after the Bluetooth authentication between the terminal and the vehicle is completed, the vehicle may unlock the vehicle door, start the engine, or the like based on the instruction of the terminal. However, as described above, this manner is vulnerable to a relay attack. In this application, after the Bluetooth authentication between the terminal and the vehicle is completed, steps 102 and 103, to be specific, the RFID authentication process between the vehicle and the RFID label, need to be performed. This can avoid a relay attack through dual authentication.

It should be noted that, in a process of performing the technical solutions in this application, if a relay attack exists in the authentication process between the RFID reader and the RFID label, the method in this application can also prevent the relay attack. For example, in the application scenario shown in FIG. 2, to be specific, when the vehicle owner is far away from the vehicle, and there are the attacker A and the attacker B between the vehicle owner and the vehicle, in the solutions of this application, the relay device A carried by the attacker A and the relay device B carried by the attacker B may also implement Bluetooth authentication between the terminal and the vehicle through transparent transmission. After the Bluetooth authentication succeeds, the attacker A may forge an RFID reader to send a request message to the RFID label, for example, the RFID label may return the label ID and a random value based on the request message. Then, the attacker A may send, to the attacker B through transparent transmission, information sent by the RFID label, for example, a data packet carrying a part of the label ID, and the attacker B transparently transmits the information to the RFID reader of the vehicle. Then, the RFID reader of the vehicle sends indication information to the RFID label again, to indicate the RFID label to return another part of the label ID, and then transparently transmits the information, through the attacker B and the attacker A, to the RFID label carried by the vehicle owner. The RFID label feeds back the another part of the label ID to the forged RFID reader, and then transparently transmits the label ID to the RFID reader of the vehicle through the attacker A and the attacker B. However, due to a network delay caused by distance, the RFID reader of the vehicle cannot receive the information (for example, the another part of the label ID) fed back by the RFID label within 86 µs or 91 µs after sending the indication information. Based on a response duration requirement in the RFID protocol, the RFID reader considers that the response times out, and the RFID authentication fails. It can be learned that the dual authentication based on the Bluetooth authentication and the RFID authentication can prevent a relay attack while ensuring authentication security. This effectively improves verification security and reliability.

In conclusion, in the solution in this embodiment of this application, only after the terminal and the vehicle complete the dual authentication, that is, the Bluetooth authentication and the RFID authentication, the vehicle determines that unlocking succeeds, and allows the user to perform an operation such as opening a vehicle door. The method in this application can effectively prevent the relay attack. In addition, because the RFID technology restricts only response duration, and an environment of an application scenario does not affect signal transmission in the RFID technology, this application is also applicable to an application scenario such as an underground garage.

In a possible implementation, the terminal, the vehicle, and the RFID label complete dual authentication, that is, the Bluetooth authentication between the terminal and the vehicle succeeds, the RFID authentication between the vehicle and the RFID label succeeds, and the terminal maintains a Bluetooth connection to the vehicle. The user may control the terminal to remotely control the vehicle within predetermined duration, for example, 1 minute. If the predetermined duration expires, the connection fails, and the terminal, the vehicle, and the RFID label need another authentication.

In a possible implementation, this embodiment of this application may also be used in a multi-terminal scenario. For example, a user A holds a terminal A, that is, a terminal on which the Bluetooth digital key application is installed, and an authorized RFID label A. A user B also wants to control a vehicle of the user A by using a terminal B. In this case, the user B may install the Bluetooth digital key application on the terminal B of the user B (the terminal is different from the terminal of the user A), and carry an RFID label B. It should be noted that label information of the RFID label B is different from label information of the RFID label A held by the user A. Specifically, the user A may authorize the terminal B by using the terminal A, and the terminal B may obtain Bluetooth authentication information stored in the terminal A, or the terminal A authorizes the terminal B, so that the terminal B and the vehicle can complete pairing. To be specific, the terminal B and the vehicle store corresponding Bluetooth authentication information, and the Bluetooth authentication information is different from the Bluetooth authentication information between the terminal A and the vehicle. The terminal B may perform step 101 to step 104 based on the Bluetooth authentication information, to complete the authentication process with the vehicle.

Figure 16:
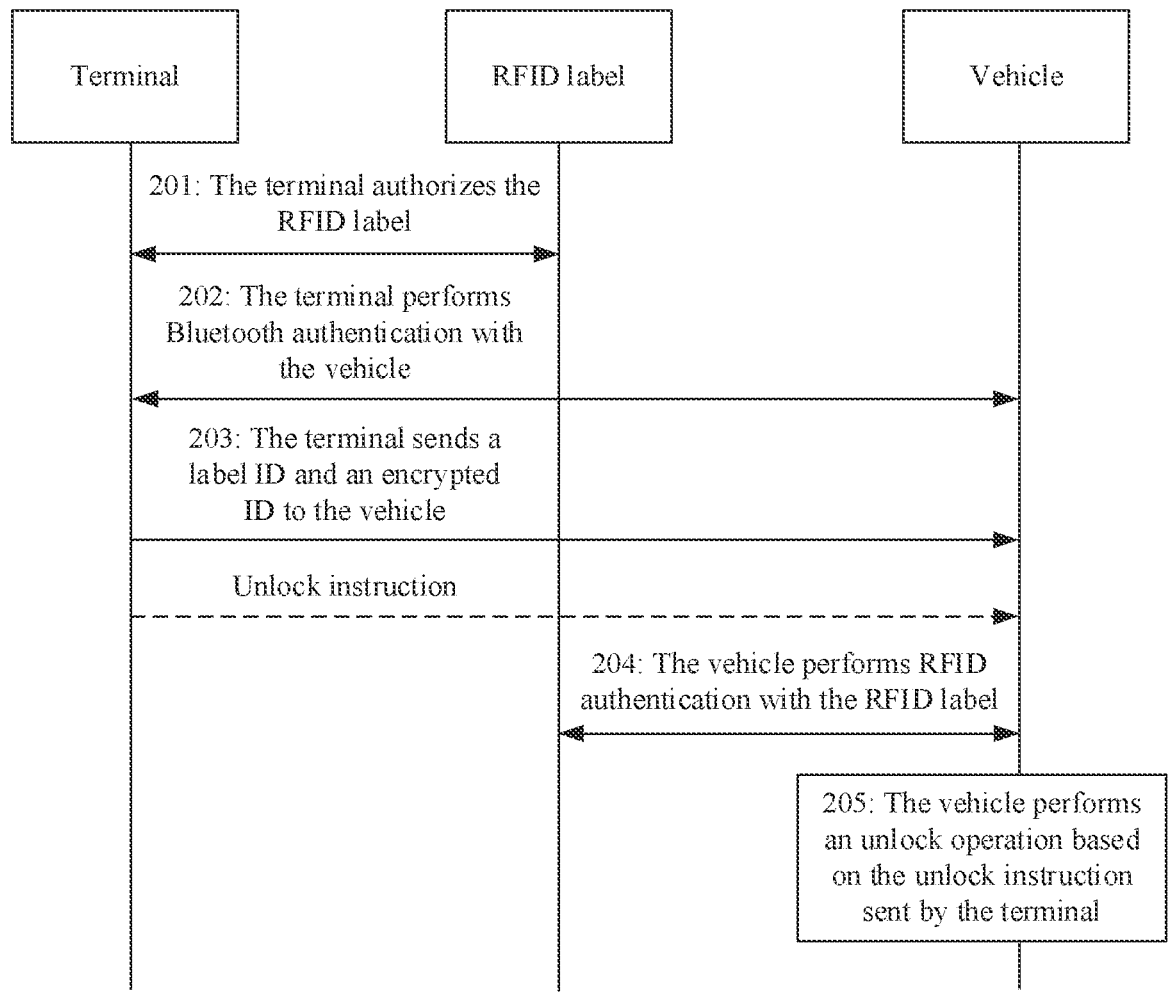
FIG. 16 is a schematic flowchart of an example of a verification method.
Figure 17:
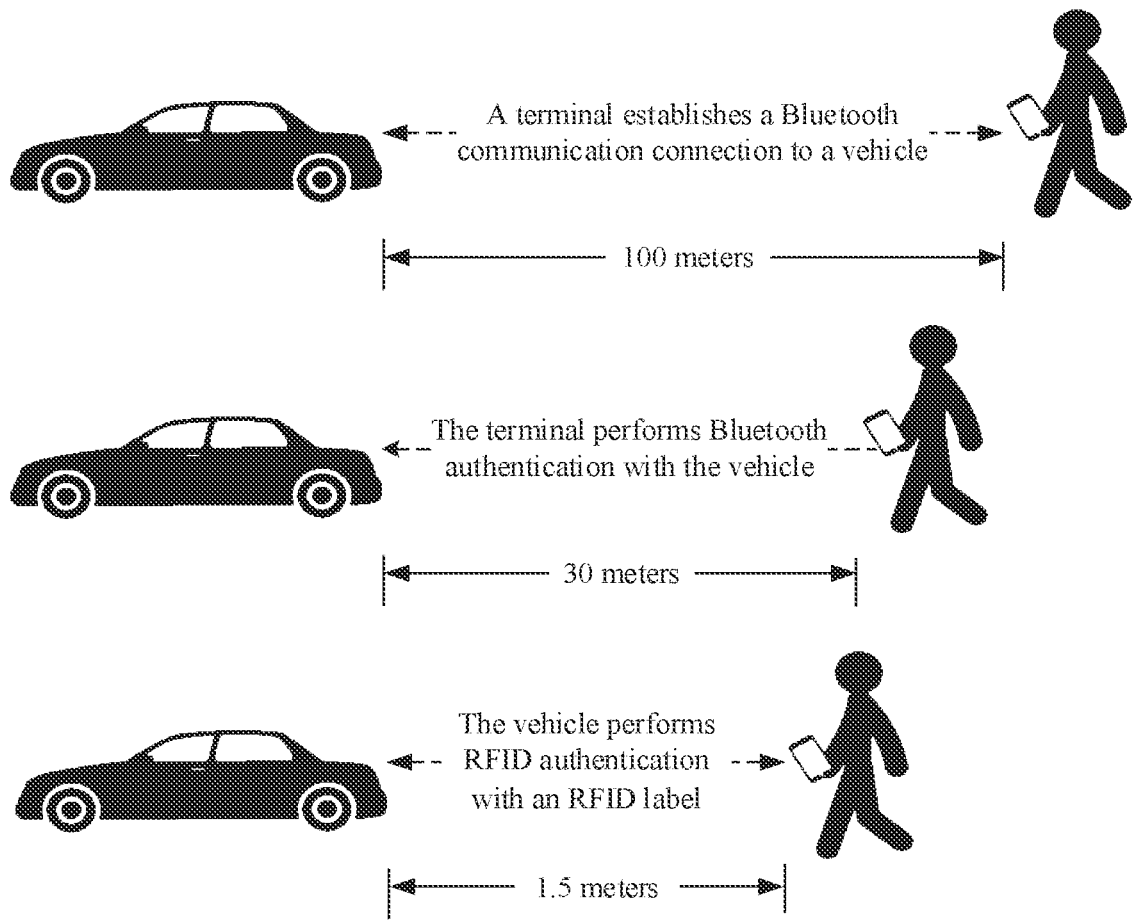
FIG. 17 is a schematic diagram of an example of an application scenario.

To make a person skilled in the art better understand the technical solutions of this application, the following uses a specific embodiment as an example for description. FIG. 16 is a schematic flowchart of an example of a verification method. Refer to FIG. 17. For example, both a terminal and a vehicle have been paired in advance, that is, store authentication information of each other. In this embodiment, the authentication information is a key. The method specifically includes the following steps.

Step 201: The terminal authorizes an RFID label.

For example, after picking up the vehicle, a user installs a Bluetooth digital key application on a mobile phone. After completing the installation, the user places the RFID label close to the mobile phone. The mobile phone detects the RFID label and authorizes the RFID label with permission of the user. Both the terminal and the vehicle store the same key (that is, the Bluetooth authentication information).

For example, the terminal reads identification information (that is, a label ID) of the RFID label, and stores the label ID in a secure zone of the terminal. Subsequently, the terminal encrypts the label ID by using the key, generates the encrypted ID (that is, authorization information), and writes the encrypted ID into the RFID.

For other details, refer to the foregoing descriptions. Details are not described herein again.

Step 202: The terminal performs Bluetooth authentication with the vehicle.

For example, a maximum transmission distance of a Bluetooth signal is 100 meters, and a maximum transmission distance of an RFID signal is 1.5 meters. The user approaches the vehicle with the terminal. After the user approaches the vehicle within the range of 100 meters, as shown in FIG. 17, the terminal detects a Bluetooth broadcast signal sent by the vehicle, and establishes a Bluetooth communication connection to the vehicle.

Subsequently, the user continues to approach the vehicle, and when the user enters a range of 30 meters from the vehicle, the terminal performs the Bluetooth authentication with the vehicle, for example, exchanges the Bluetooth authentication information. After the Bluetooth authentication between the terminal and the vehicle succeeds, the terminal sends an unlock instruction to the vehicle. After receiving the unlock instruction, the vehicle does not perform any operation.

Step 203: The terminal sends the label ID and the encrypted ID to the vehicle.

For example, after authentication between the terminal and the vehicle succeeds, for example, the terminal receives a Bluetooth authentication success message sent by the vehicle, the terminal sends the label ID and the encrypted ID to the vehicle.

Step 204: The vehicle performs RFID authentication with the RFID label.

For example, refer to FIG. 17. The user continues to approach the vehicle, and when the user enters a range of 1.5 meters from the vehicle, the RFID label detects a request message sent by the RFID reader, and performs the RFID authentication with the RFID reader. Because the RFID label is very close to the RFID reader (1.5 meters), in the interaction process between the RFID reader and the RFID label, response duration of each piece of information may meet an RFID protocol standard. Therefore, the RFID reader and the RFID label may successfully perform the RFID authentication. For specific details, refer to FIG. 13. Details are not described herein again.

It should be noted that the RFID label may also receive the request message sent by the RFID reader at a distance greater than 1.5 meters, for example, 20 meters. For example, the RFID label and the RFID reader can receive a message from each other, if the response duration in the interaction process does not comply with the RFID protocol standard, the RFID reader considers that the RFID authentication fails. As the user approaches the vehicle, the response time between the RFID reader and the RFID label becomes shorter. When the RFID protocol standards are met, the RFID authentication completes.

Step 205: The vehicle performs an unlock operation based on the unlock instruction sent by the terminal.

For example, after the MCU determines that the RFID authentication succeeds, that is, the dual authentication is complete, an MCU may trigger, based on the unlock instruction received in step 202, a BCM to perform an unlock operation, and the BCM unlocks the vehicle door based on indication of the MCU. The user continues to approach the vehicle. In this case, the vehicle is unlocked, and the user can directly open the door to enter the vehicle and start the vehicle.

The foregoing mainly describes the solutions provided in embodiments of this application from a perspective of interaction between network elements. It may be understood that, to implement the foregoing functions, a verification apparatus includes a hardware structure and/or a software module for performing a corresponding function. A person skilled in the art should easily be aware that, in combination with units and algorithm steps of the examples described in embodiments disclosed in this specification, this embodiment of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the verification apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 18:
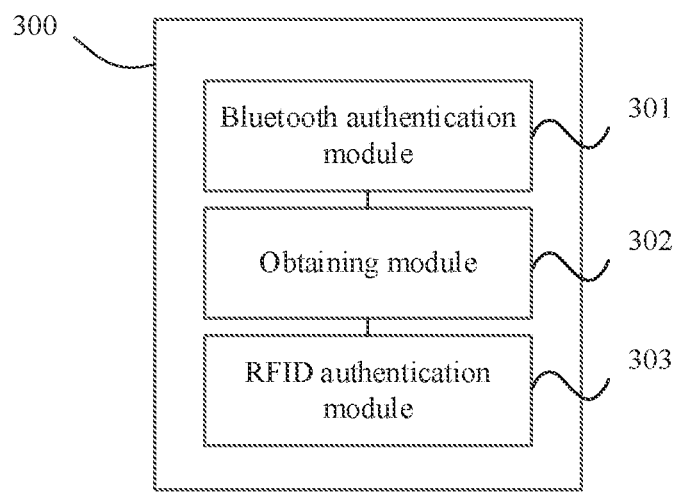
FIG. 18 is a schematic diagram of a structure of a verification apparatus according to an embodiment of this application.

When each functional module is obtained through division based on each corresponding function, FIG. 18 is a possible schematic diagram of a structure of a verification apparatus 300 in the foregoing embodiment. As shown in FIG. 18, the verification apparatus may include a Bluetooth authentication module 301, an obtaining module 302, and an RFID authentication module 303. The Bluetooth authentication module 301 is configured to perform Bluetooth authentication with a terminal based on Bluetooth authentication information. The obtaining module 302 is configured to: after the Bluetooth authentication with the terminal succeeds, obtain radio frequency identification RFID authentication information, where the RFID authentication information includes label information and authorization information of an RFID label, and the authorization information is used to indicate an association relationship between the RFID label and the terminal. The RFID authentication module 303 is configured to perform RFID authentication based on the RFID authentication information. After the RFID authentication succeeds, a controlled device is in a controllable state.

In a possible implementation, the RFID authentication module 303 is specifically configured to perform the RFID authentication with the RFID label based on the RFID authentication information.

In a possible implementation, the RFID label stores the label information and the authorization information, and the RFID authentication module 303 is configured to: send verification information and the obtained label information to the RFID label; receive encrypted verification information sent by the RFID label, where the encrypted verification information is obtained after the RFID label encrypts the verification information based on the authorization information stored in the RFID label; and in response to the received encrypted verification information, decrypt the encrypted verification information based on the obtained authorization information, to obtain the verification information, and determine that the RFID authentication succeeds.

In a possible implementation, the RFID authentication module 303 is specifically configured to: receive a first part of the encrypted verification information sent by the RFID label; send first indication information to the RFID label, to indicate the RFID label to send a second part of the encrypted verification information; and if the second part of the encrypted verification information sent by the RFID label is received within preset duration, determine that the encrypted verification information is successfully received.

In a possible implementation, the RFID label stores the label information and the authorization information, and the RFID authentication module 303 is specifically configured to: send a request message to the RFID label, to indicate the RFID label to send the verification information of the RFID label and the label information stored in the RFID label; encrypt, based on the label information sent by the RFID label, the verification information by using the obtained authorization information, and send the encrypted verification information to the RFID label; and in response to a received acknowledge message sent by the RFID label, determine that the RFID authentication succeeds.

In a possible implementation, the RFID authentication module 303 is specifically configured to: receive a first part of the label information sent by the RFID label; send first indication information to the RFID label, to indicate the RFID label to send a second part of the label information; and if the second part of the label information sent by the RFID label is received within preset duration, determine that the label information is successfully received.

In a possible implementation, the obtaining module 302 is configured to: receive the RFID authentication information sent by the terminal.

In a possible implementation, the Bluetooth authentication module 301 is configured to: send Bluetooth authentication request information; and after receiving a Bluetooth authentication response message sent by the terminal, establish a Bluetooth communication connection to the terminal, and when a distance from the terminal is less than or equal to a first threshold, perform the Bluetooth authentication with the terminal based on the Bluetooth authentication information.

In a possible implementation, the label information includes at least one of the following: identification information of the RFID label and content information of the RFID label.

In a possible implementation, the authorization information includes at least one of the following: signature information of the terminal and encrypted label information.

Figure 19:
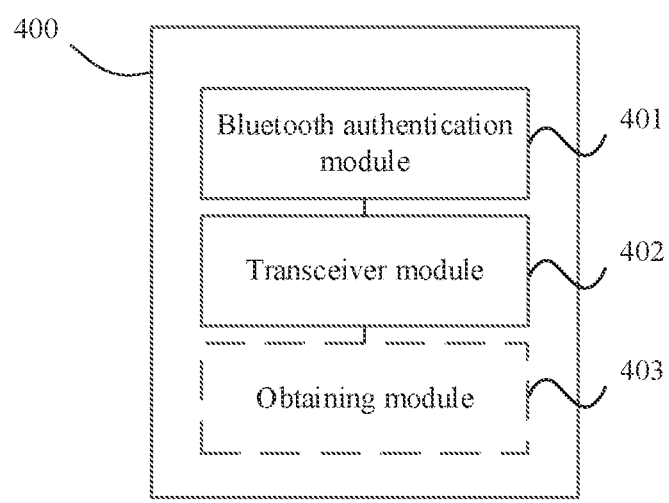
FIG. 19 is a schematic diagram of a structure of a verification apparatus according to an embodiment of this application.

In another example, FIG. 19 is a possible schematic diagram of a structure of a verification apparatus 400 in the foregoing embodiment. As shown in FIG. 19, the verification apparatus 400 may include a Bluetooth authentication module 401 and a transceiver module 402. The Bluetooth authentication module 401 is configured to perform Bluetooth authentication with a controlled device based on Bluetooth authentication information. The transceiver module 402 is configured to: after the Bluetooth authentication with the controlled device succeeds, send RFID authentication information to the controlled device, to indicate the controlled device to perform RFID authentication based on the RFID authentication information, where the RFID authentication information includes label information and authorization information of an RFID label, and the authorization information is used to indicate an association relationship between the RFID label and a terminal.

In a possible implementation, the verification apparatus 400 may further include an obtaining module 403, configured to authorize the RFID label to obtain the RFID authentication information.

In a possible implementation, the obtaining module 403 is specifically configured to: receive the label information sent by the RFID label; and send the authorization information to the RFID label.

In a possible implementation, the label information includes at least one of the following: identification information of the RFID label and content information of the RFID label.

In a possible implementation, the authorization information includes at least one of the following: signature information of the terminal and encrypted label information.

All related content of the steps in the foregoing method embodiments may be cited in function descriptions of corresponding function modules. Details are not described herein again.

Based on a same technical idea, an embodiment of this application further provides a computer-readable storage medium. The computer-readable storage medium stores a computer program, the computer program includes at least one segment of code, and the at least one segment of code may be executed by a verification apparatus, to control the verification apparatus to implement the foregoing method embodiments.

Based on a same technical idea, an embodiment of this application further provides a computer program. When the computer program is executed by a verification apparatus, the foregoing method embodiments are implemented.

The program may be all or partially stored in a storage medium that is encapsulated with a processor, or may be all or partially stored in a memory that is not encapsulated with a processor.

Based on a same technical concept, an embodiment of this application further provides a processor. The processor is configured to implement the foregoing method embodiments. The processor may be a chip.

Based on a same technical concept, an embodiment of this application further provides a verification system. The system includes the controlled device and the terminal in the foregoing method embodiments.

Methods or algorithm steps described in combination with the content disclosed in this embodiment of this application may be implemented by hardware, or may be implemented by a processor by executing software instructions. The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be disposed in a network device. Certainly, the processor and the storage medium may exist in the network device as discrete components.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a special-purpose computer.

The foregoing describes embodiments of this application with reference to the accompanying drawings. However, this application is not limited to the foregoing specific implementations. The foregoing specific implementations are merely examples, but are not restrictive. Inspired by this application, a person of ordinary skill in the art may further make many modifications without departing from the purposes of this application and the protection scope of the claims, and all the modifications shall fall within the protection scope of this application.

What is claimed is:

1. A verification method implemented by a controlled device and comprising:
    establishing, when a terminal is within a first distance of the controlled device, a Bluetooth communication connection to the terminal;
    performing, when the terminal is within a second distance of the controlled device, Bluetooth authentication with the terminal based on Bluetooth authentication information, wherein the first distance is greater than the second distance;
    obtaining, when the Bluetooth authentication with the terminal succeeds, and when the terminal is within a third distance of the controlled device, radio frequency identification (RFID) authentication information, wherein the RFID authentication information comprises label information and authorization information of an RFID label, wherein the authorization information indicates an association relationship between the RFID label and the terminal, and wherein the second distance is greater than the third distance;
    performing RFID authentication based on the RFID authentication information, wherein the RFID authentication succeeds when the RFID authentication information is obtained within a preset duration; and
    entering a controllable state when the RFID authentication succeeds.

2. The verification method according to claim 1, further comprising further performing the RFID authentication with the RFID label.

3. The verification method according to claim 1, wherein the RFID label stores the authorization information, and wherein the verification method further comprises:
    sending verification information and the label information to the RFID label;
    receiving, from the RFID label and in response to sending the verification information and the label information, encrypted verification information, that is based on the authorization information;
    decrypting the encrypted verification information based on the authorization information; and
    determining that the RFID authentication succeeds when obtaining the verification information from decrypting the encrypted verification information.

4. The verification method according to claim 3, further comprising:
    receiving a first part of the encrypted verification information from the RFID label;
    sending, in response to receiving the first part, first indication information to the RFID label to request a second part of the encrypted verification information; and
    determining, when receiving the second part of the encrypted verification information within the preset duration, that the encrypted verification information is successfully received.

5. The verification method according to claim 1, wherein the RFID label stores the label information and verification information, and wherein the verification method further comprises:
    sending a request message to the RFID label to obtain the verification information and the label information;
    encrypting, based on the label information, the verification information using the authorization information to obtain encrypted verification information;
    sending the encrypted verification information to the RFID label;
    receiving an acknowledge message from the RFID label; and
    determining, in response to receiving the acknowledge message, that the RFID authentication succeeds.

6. The verification method according to claim 5, further comprising:
    receiving a first part of the label information from the RFID label;
    sending, in response to receiving the first part, first indication information to the RFID label to request a second part of the label information; and
    determining, when receiving the second part of the label information within the preset duration, that the label information is successfully received.

7. The verification method according to claim 1, further comprising receiving the RFID authentication information from the terminal.

8. The verification method according to claim 1, further comprising:
    sending Bluetooth authentication request information;
    receiving a Bluetooth authentication response message from the terminal in response to the Bluetooth authentication request information;
    establishing, in response to receiving the Bluetooth authentication response message, the Bluetooth communication connection with the terminal; and
    further performing, when the terminal is within the second distance of the controlled device, the Bluetooth authentication with the terminal.

9. The verification method according to claim 1, wherein the label information comprises at least one of identification information of the RFID label or content information of the RFID label.

10. The verification method according to claim 1, wherein the authorization information comprises at least one of signature information of the terminal or encrypted label information.

11. The verification method according to claim 1, wherein after entering the controllable state, the method further comprises unlocking or starting based on a preset instruction or an instruction of the terminal.

12. A verification method implemented by a terminal and comprising:
    establishing, when the terminal is within a first distance of a controlled device, a Bluetooth communication connection to the terminal;
    performing, when the terminal is within a second distance of the controlled device, Bluetooth authentication with the controlled device based on Bluetooth authentication information; and
    sending, when the Bluetooth authentication with the controlled device succeeds, and when the terminal is within a third distance of the controlled device, radio frequency identification (RFID) authentication information to the controlled device to enable the controlled device to perform RFID authentication based on the RFID authentication information, wherein the RFID authentication information comprises label information and authorization information of an RFID label, wherein the authorization information indicates an association relationship between the RFID label and the terminal, wherein the second distance is greater than the third distance, and wherein the RFID authentication succeeds when the RFID authentication information is received by the control device within a preset duration.

13. The verification method according to claim 12, wherein before performing the Bluetooth authentication with the controlled device, the verification method further comprises authorizing the RFID label to obtain the RFID authentication information.

14. The verification method according to claim 13, further comprising:
receiving the label information from the RFID label; and
sending the authorization information to the RFID label.

15. The verification method according to claim 12, wherein the label information comprises at least one of identification information of the RFID label or content information of the RFID label.

16. The verification method according to claim 12, wherein the authorization information comprises at least one of signature information of the terminal or encrypted label information.

17. A verification apparatus comprising:
a memory configured to store program instructions; and
one or more processors coupled to the memory and configured to execute the program instructions to cause the verification apparatus to:
establish, when a terminal is within a first distance of the verification apparatus, a Bluetooth communication connection to the terminal;
perform, when the terminal is within a second distance of the verification apparatus, Bluetooth authentication with the terminal based on Bluetooth authentication information, wherein the first distance is greater than the second distance;
obtain, when the Bluetooth authentication with the terminal succeeds, and when the terminal is within a third distance of the verification apparatus, radio frequency identification (RFID) authentication information, wherein the RFID authentication information comprises label information and authorization information of an RFID label, wherein the authorization information indicates an association relationship between the RFID label and the terminal, and wherein the second distance is greater than the third distance;
perform RFID authentication based on the RFID authentication information, wherein the RFID authentication succeeds when the RFID authentication information is obtained within a preset duration; and
enter a controllable state when the RFID authentication succeeds.

18. The verification apparatus according to claim 17, wherein the one or more processors are further configured to:
send verification information and the label information to the RFID label;
receive, from the RFID label and in response to sending the verification information and the label information, encrypted verification information that is based on the authorization information;
decrypt the encrypted verification information based on the authorization information; and
determine that the RFID authentication succeeds when obtaining the verification information from decrypting the encrypted verification information.

19. The verification apparatus according to claim 18, wherein the one or more processors are further configured to:
receive a first part of the encrypted verification information from the RFID label;
send, in response to receiving the first part, first indication information to the RFID label to request a second part of the encrypted verification information; and
determine, when the second part is received within the preset duration, that the encrypted verification information is successfully received.

20. The verification apparatus according to claim 17, wherein the one or more processors are further configured to:
send a request message to the RFID label and the label information;
send verification information and the label information to the RFID label;
encrypt, based on the label information, the verification information using the authorization information;
send the encrypted verification information to the RFID label;
receive an acknowledge message from the RFID label; and
determine, in response to receiving the acknowledge message, that the RFID authentication succeeds.

\* \* \* \* \*